(12) United States Patent
Lutz et al.

(10) Patent No.: US 10,136,620 B2
(45) Date of Patent: Nov. 27, 2018

(54) FILTRATION SYSTEMS FOR AQUARIUMS

(71) Applicant: Elive LLC, New Berlin, WI (US)

(72) Inventors: Thomas Lutz, Cedar Rapids, IA (US); Ernie Katris, New Berlin, WI (US)

(73) Assignee: Elive LLC, New Berlin, WI (US)

( * ) Notice: Subject to any disclaimer, the term of this patent is extended or adjusted under 35 U.S.C. 154(b) by 597 days.

(21) Appl. No.: 14/585,781

(22) Filed: Dec. 30, 2014

(65) Prior Publication Data

US 2015/0181843 A1    Jul. 2, 2015

Related U.S. Application Data (60) Provisional application No. 61/921,862, filed on Dec. 30, 2013.

(51) Int. Cl.
| | | |
|---|---|---|
| *A01K 63/04* | (2006.01) | |
| *C02F 1/00* | (2006.01) | |
| *C02F 103/20* | (2006.01) | |

(52) U.S. Cl.
CPC ............ *A01K 63/045* (2013.01); *C02F 1/001* (2013.01); *C02F 2103/20* (2013.01)

(58) Field of Classification Search
None
See application file for complete search history.

(56) References Cited

U.S. PATENT DOCUMENTS

| | | |
|---|---|---|
| D183,884 S | 11/1958 | Halpert |
| D216,259 S | 12/1969 | Sesholtz |
| D235,260 S | 6/1975 | Danner |
| 4,151,810 A * | 5/1979 | Wiggins ............... A01K 63/045 119/262 |
| D268,607 S | 4/1983 | Malik |
| 4,483,769 A | 11/1984 | Sherman |
| D295,441 S | 4/1988 | Tominaga |
| D296,001 S | 5/1988 | Ng |
| 4,842,727 A * | 6/1989 | Willinger ............. A01K 63/045 137/563 |
| D392,717 S | 3/1998 | Conger, IV |
| D474,526 S | 5/2003 | Mayer |
| 7,425,274 B1 | 9/2008 | Helfet |
| 8,303,811 B1 | 11/2012 | Mihlbauer |

(Continued)

FOREIGN PATENT DOCUMENTS

DE    202009013110    1/2010

OTHER PUBLICATIONS

Office Action and Search Report from the German Patent and Trademark Office for Application No. 20 2009 013 110.6 dated Apr. 9, 2015 (8 pages).

(Continued)

*Primary Examiner* — Richard C Gurtowski
(74) *Attorney, Agent, or Firm* — Michael Best & Friedrich LLP (57) ABSTRACT

A filtration system for a fish tank includes an upper housing having an inner cavity. The filtration system also includes a lower housing slidingly coupled to the upper housing to permit changes in an overall length of the filtration system. The filtration system also includes a filter cartridge disposed at least partially within the inner cavity, and a pump disposed at least partially within the inner cavity that draws water into the inner cavity and through the plurality of filter cartridges.

21 Claims, 10 Drawing Sheets

(56) References Cited

U.S. PATENT DOCUMENTS

| | | |
|---|---|---|
| D674,037 S | 1/2013 | Ishikawa et al. |
| D686,694 S | 7/2013 | Li |
| 8,475,657 B2 | 7/2013 | Wu |
| 2013/0168327 A1* | 7/2013 | Clark .................... G01N 21/77 210/739 |
| 2013/0168332 A1* | 7/2013 | Appling ................ B01D 29/66 210/797 |

OTHER PUBLICATIONS

"EcoQube—Desktop Ecosystem That Grows Flowers and Herbs", by Aqua Design Innovations, https://www.kickstarter.com/projects/kevinzl/ecoqube-desktop-ecosystem-that-grow-flowers-and-he, Dec. 30, 2013 (25 pages).

* cited by examiner

FILTRATION SYSTEMS FOR AQUARIUMS

CROSS-REFERENCE TO RELATED APPLICATIONS

This application claims priority to U.S. Provisional Application No. 61/921,862, filed Dec. 30, 2013, the entire contents of which are incorporated herein by reference.

FIELD OF THE INVENTION

The present invention relates to aquariums, and specifically to filtration systems for aquariums.

BACKGROUND

Traditional filtration systems for an aquarium move water from the aquarium through a filter element to remove impurities from the water, and then return the filtered water back to the aquarium. The filtration systems often employ the use of a mechanical pump to move the water through the filter element. However, the filtration systems are not well adapted for use on different-sized aquariums, and the filter elements inside the filtration system are often difficult to access and replace without interrupting the filtration process.

SUMMARY

In one construction, the invention provides a filtration system for a fish tank that includes an upper housing having an inner cavity. The filtration system also includes a lower housing slidingly coupled to the upper housing to permit changes in an overall length of the filtration system. The filtration system also includes a filter cartridge disposed at least partially within the inner cavity, and a pump disposed at least partially within the inner cavity that draws water into the inner cavity and through the filter cartridge.

In another construction, the invention provides a filtration system for a fish tank that includes an upper housing having a cavity, a lower housing coupled to the upper housing, and a plurality of modular filter cartridges disposed within the cavity and releasably coupled to one another. Each of the modular filter cartridges includes a first guide element along a first side of the filter cartridge and a second guide element along an opposite side of the filter cartridge, such that at least one of the first guide elements on a first filter cartridge is removably coupled with a second guide element on a second filter cartridge. The filtration system also includes a pump disposed within the cavity that draws water into the cavity and through the plurality of modular filter cartridges.

Other aspects of the invention will become apparent by consideration of the detailed description and accompanying drawings.

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limited.

DETAILED DESCRIPTION

Figure 1:
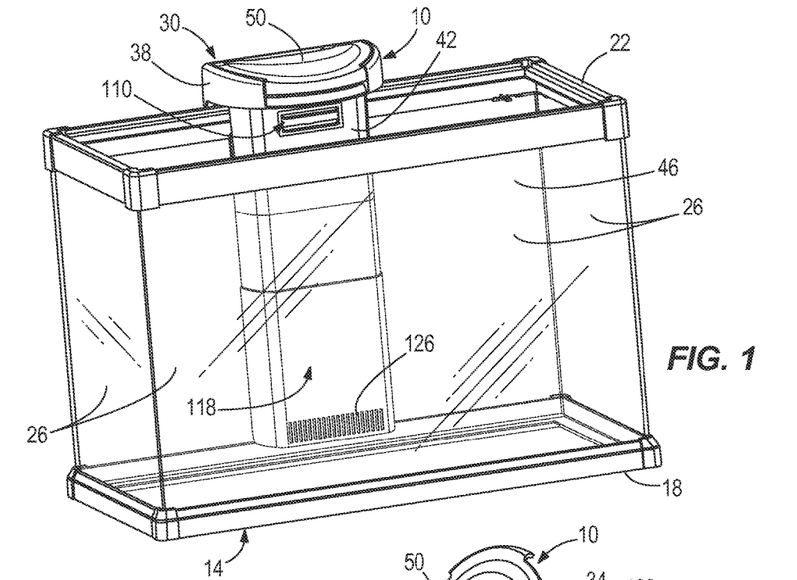
FIG. 1 is a front perspective view of a filtration system according to one constructions of the invention.
Figure 2:
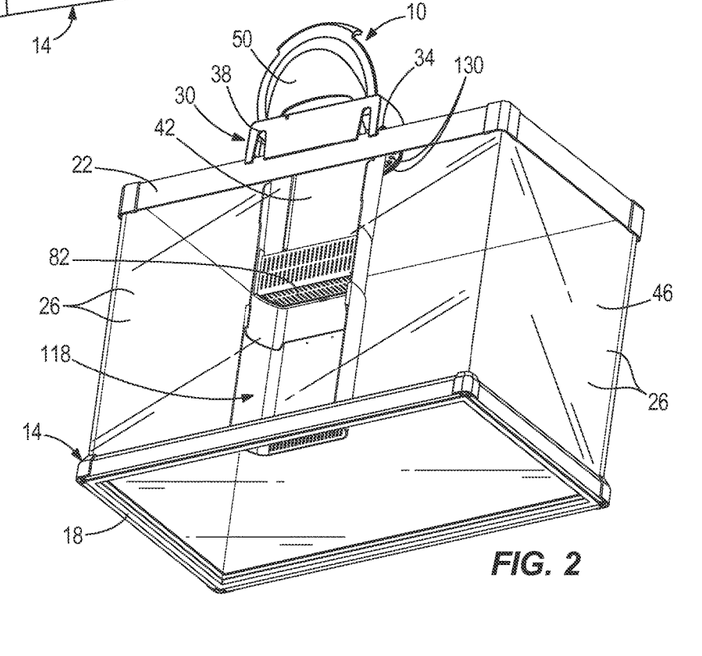
FIG. 2 is a front perspective view of the filtration system of FIG. 1, illustrating a cover that is pivoted to an open position.

FIGS. 1-12 illustrate a filtration system 10 for use with an aquarium 14. The illustrated aquarium 14 is a twenty-gallon aquarium having a base 18, a top open frame 22, and walls 26 extending between the base 18 and the frame 22, although other aquariums may also be used with the filtration system 10. As illustrated in FIGS. 1 and 2, the filtration system 10 is removably coupled to the frame 22.

Figure 3:
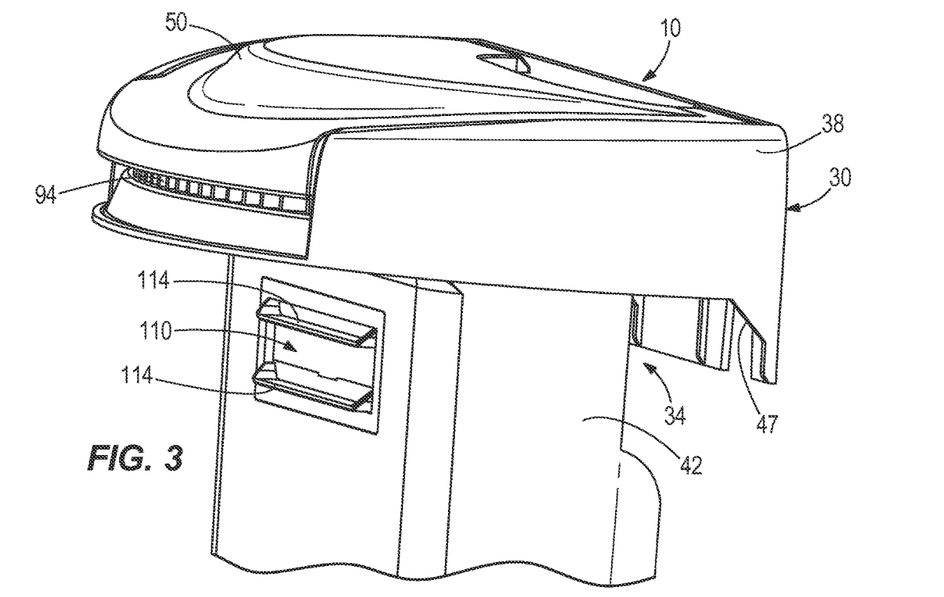
FIG. 3 is a perspective view of a portion of the filtration system of FIG. 1, illustrating a bypass door.

With reference to FIGS. 1-4, the filtration system 10 includes an upper housing 30 with a rear, notched area 34 (as illustrated in FIG. 3) that removably hooks over the frame 22 to couple the filtration system 10 to the aquarium 14. The upper housing 30 includes a first portion 38 that is disposed above the frame 22 when the filtration system 10 is coupled to the aquarium 14 and a second portion 42 that extends within an interior 46 of the aquarium 14 when the filtration system 10 is coupled to the aquarium 14.

As is best illustrated in FIG. 3, the notched area 34 is partially defined by angled surfaces 47 (one visible in FIG. 3). The angled surfaces are positioned and angled such that the width of the notched area 34, when measured normal to a rear surface of the upper housing 30, decreases moving upward along the upper housing 30 toward the cover 50. This feature allows the filter to snugly engage any aquarium frame that has a width between the largest width of the notch and the narrowest width of the notch while assuring that the rear surface of the filter is flush with and in contact with the aquarium wall.

Figure 4:
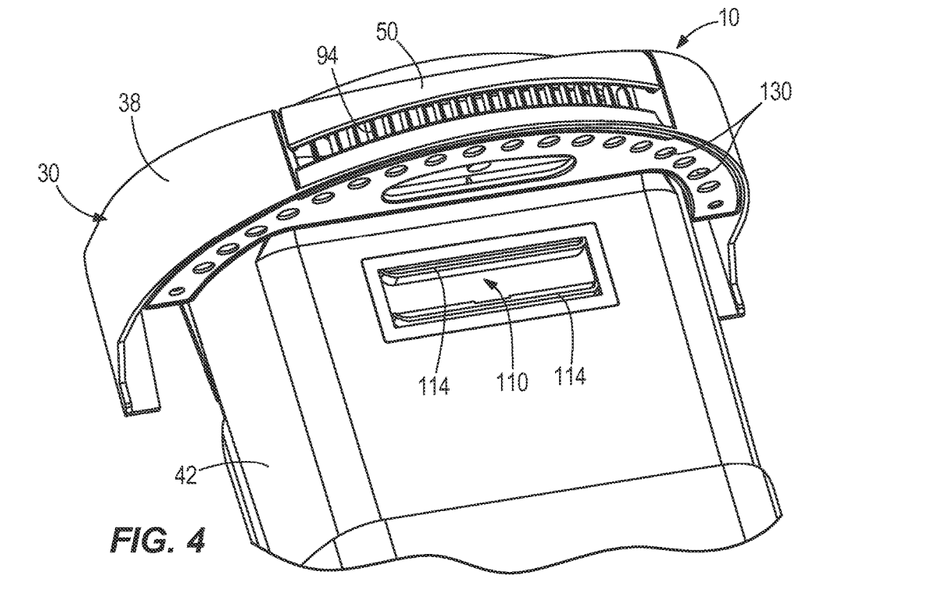
FIG. 4 is a perspective view of a portion of the filtration system of FIG. 1, illustrating a plurality of LED lights.
Figures 5, 6:
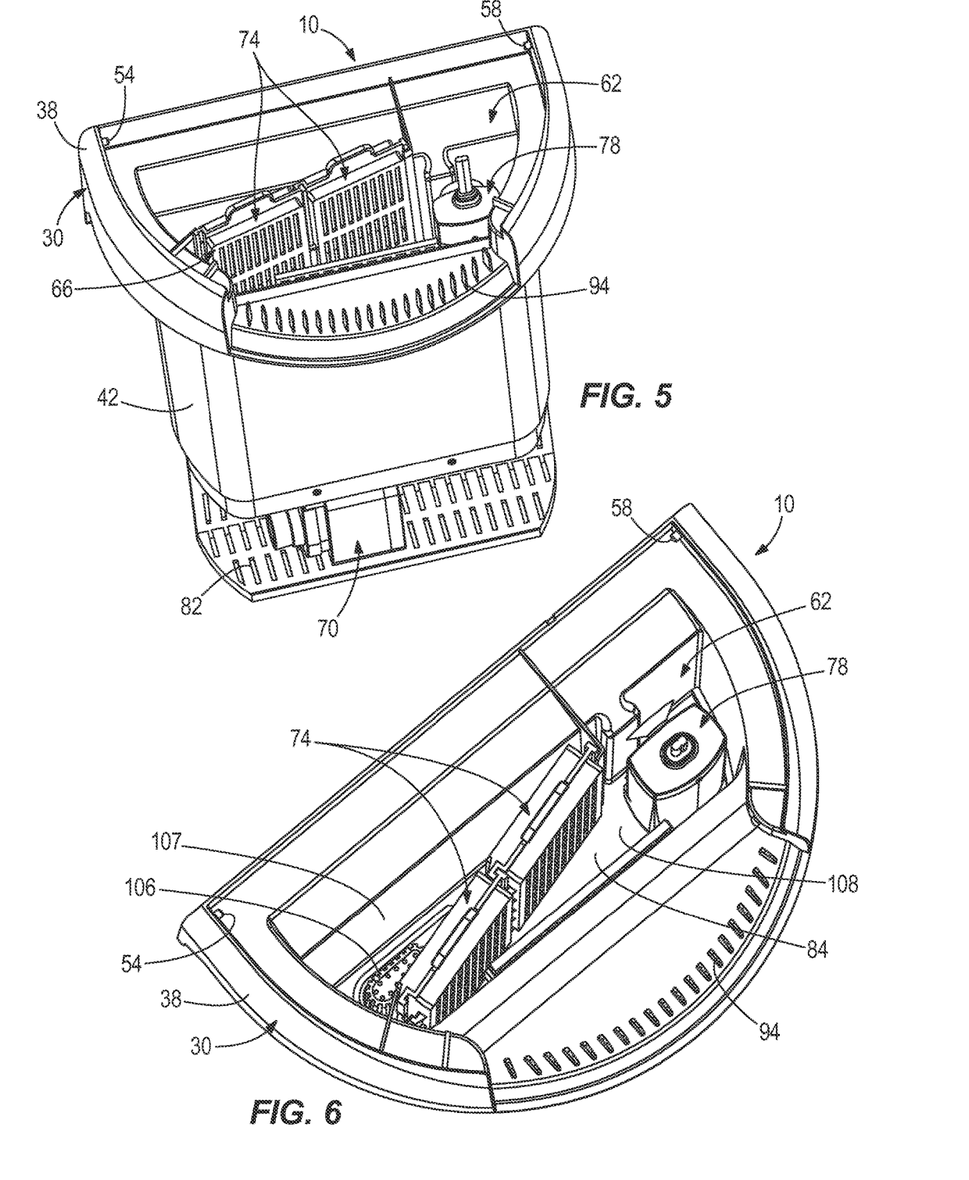
FIG. 5-7 are perspective views of a portion of the filtration system of FIG. 1, illustrating a filter and pump assembly disposed within a housing of the filtration system.
Figure 7:
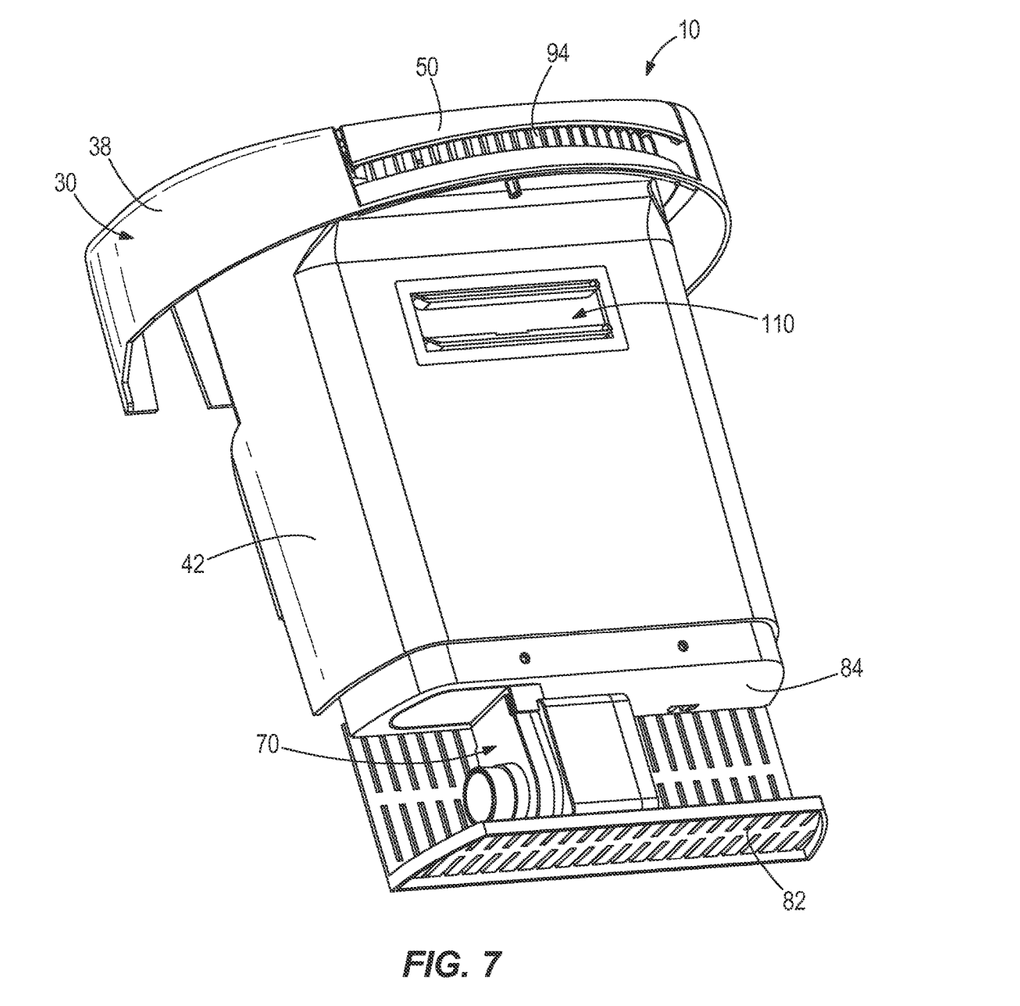
Figure 8:
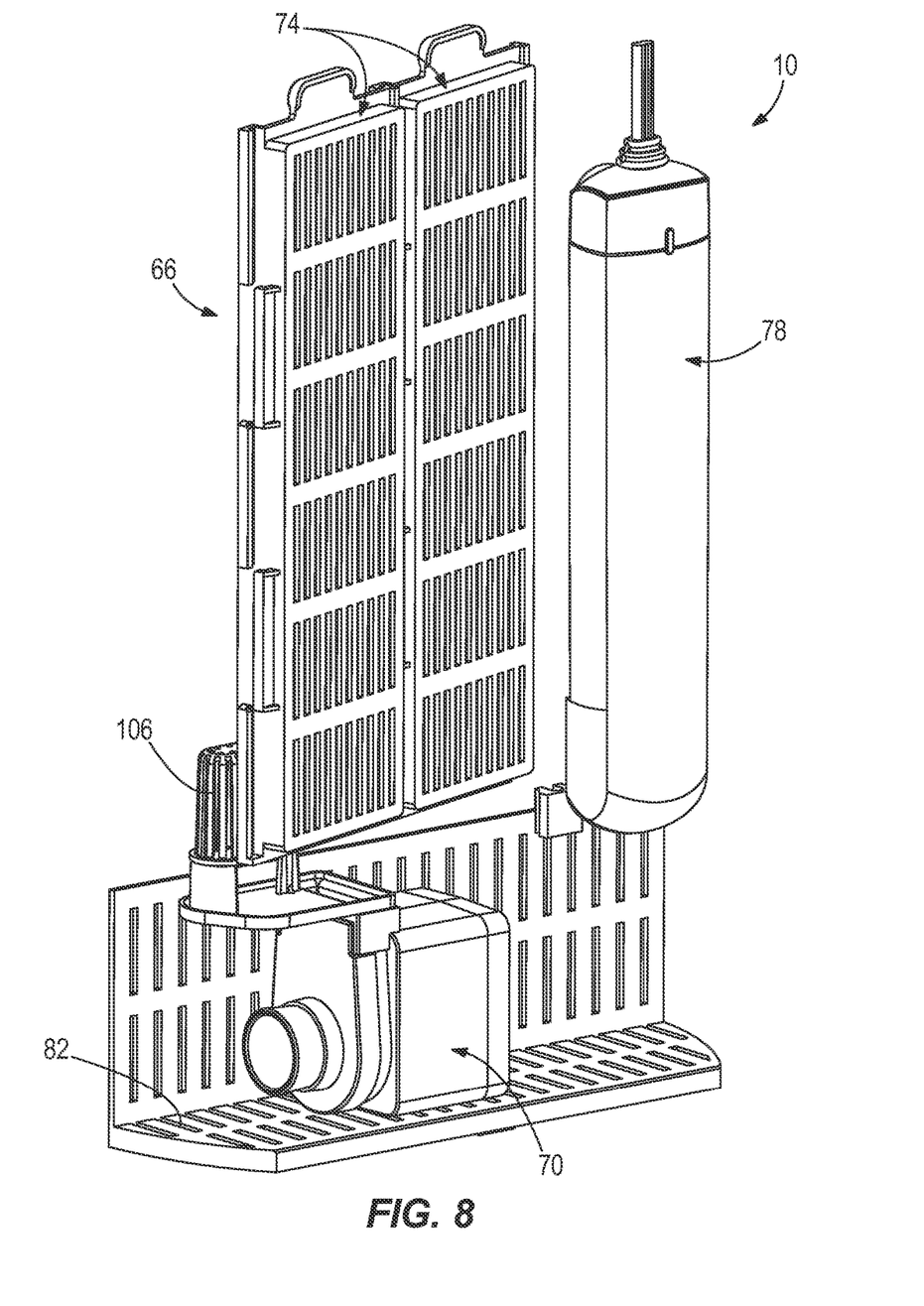
FIG. 8 is a perspective view of the filter and pump assembly.

With reference to FIGS. 1-5, the first portion 38 includes a cover 50 that is pivotally coupled to the upper housing 30 and is pivotal about two pivot pins 54, 58 (as illustrated in FIG. 5) between a closed position (as illustrated in FIG. 1) and an open position (as illustrated in FIG. 2). As illustrated in FIG. 5, the cover 50 covers and protects an inner cavity 62 disposed within the upper housing 30 when the cover 50 is in the closed position.

With reference to FIGS. 5-11, the inner cavity 62 houses at least a portion of a filter and pump assembly 66. The illustrated filter and pump assembly 66 includes a pump 70, a pair of filter cartridges 74, and a heater and/or control unit 78. The pump 70 pumps water from the aquarium 14 into the upper housing 30 through the filter cartridges 74, where the water is filtered and cleaned before being returned to the aquarium 14. In the illustrated construction the upper housing 30 includes a water inlet 82 in the form of a vent. The pump 70 is disposed above the water inlet 82, and pumps water up through the water inlet 82 and then through a bottom wall 84 (FIGS. 6 and 7) and into the inner cavity 62. The pump 70 is disposed both below and above the wall 84, so as to move water up into the cavity 62. Once the water is pumped into the cavity 62, the water is sent through the filter cartridges 74 and is filtered with the filter cartridges 74. The pump 70 remains submerged in water during filtration.

In some constructions, the heater and/or control unit 78 includes only a heater, a controller, and a temperature sensor. The sensor measures the water temperature as it passes through the filter and provides that measured temperature to the controller. The controller then compares the measured temperature to a desired temperature and then directs power to the heater as required to heat the water.

Figure 9:
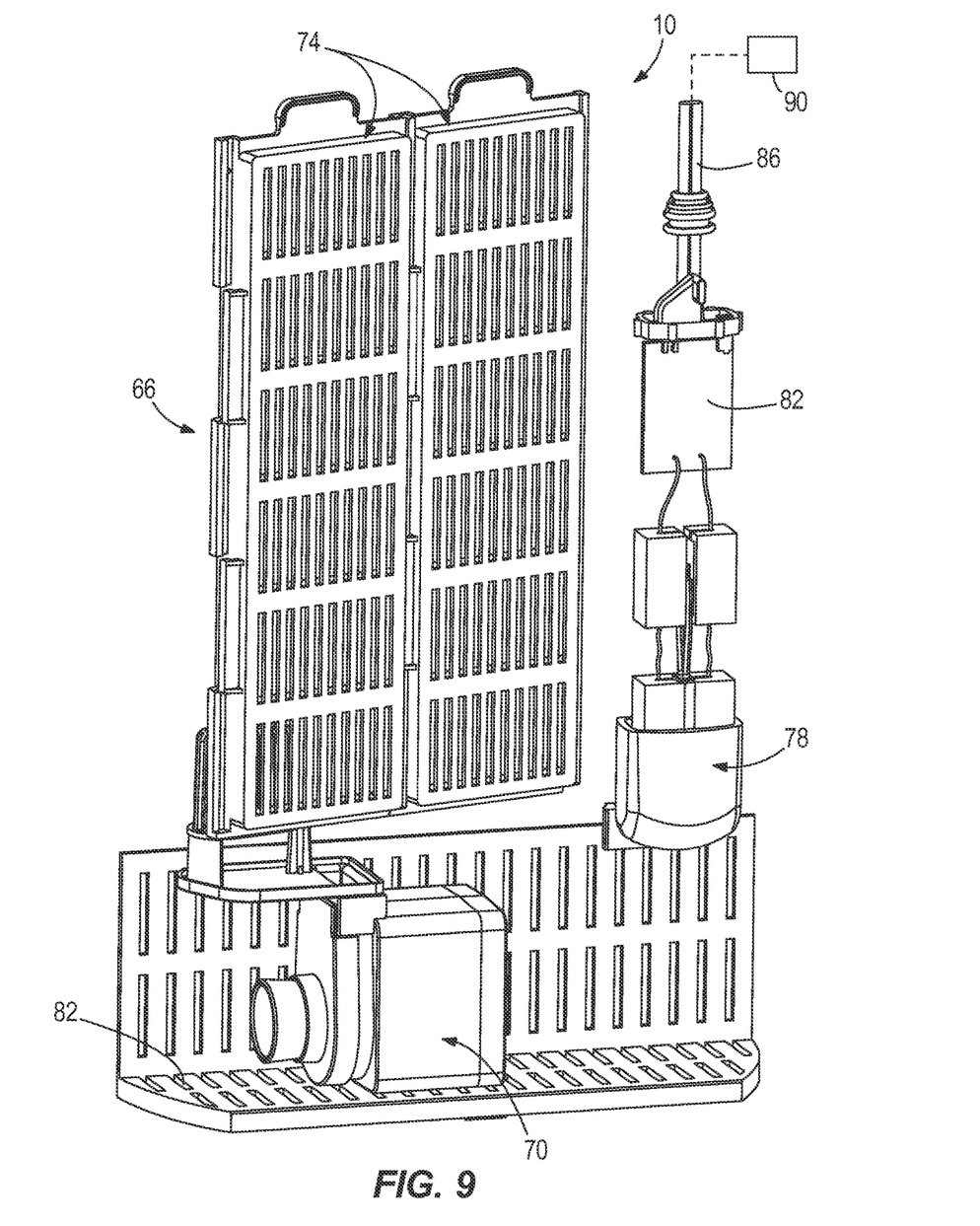
FIG. 9 is a perspective view of the filter and pump assembly, illustrating a printed circuit board within a control unit.

In other constructions, the heater and/or control unit 78 includes both a heater as described above and a control unit in combination or a control unit alone. The heater and/or control unit 78 controls operation of the pump 70 (e.g., controls an on/off state, speed of the pump, etc.). The heater and/or control unit 78 is electronically coupled to the pump 70 (e.g., to a motor within the pump 70). As illustrated in FIG. 9, the heater and/or control unit 78 includes a printed circuit board 82 that is coupled, for example via a wire or wires 86, to a switch 90 (illustrated schematically). The switch 90 may be used to control operation of the pump 70. The switch 90 may be located on the filtration system 10, or may be located remotely.

With reference to FIGS. 3-7, once the pump 70 and the heater and/or control unit 78 have pumped water through the filter cartridges 70, the filtered water exits the upper housing 30 through a water outlet 94. The illustrated water outlet 94 is a vent disposed along a front of the upper housing 30, directly below the cover 50 when the cover 50 is closed. Other constructions include different locations for the water outlet 94. The water outlet 94 directs the filtered water back into the interior 46 of the aquarium. The water outlet 94 creates a waterfall-like effect when the water is discharged from above the water level of the tank. Filtered water passes through the water outlet 94 and falls (due to gravity) out of the housing 30 and back into unfiltered water already disposed within the interior 46 below the water outlet 94. The effect both aerates the water within the tank and makes a noise that can be enjoyable.

Figures 10, 11:
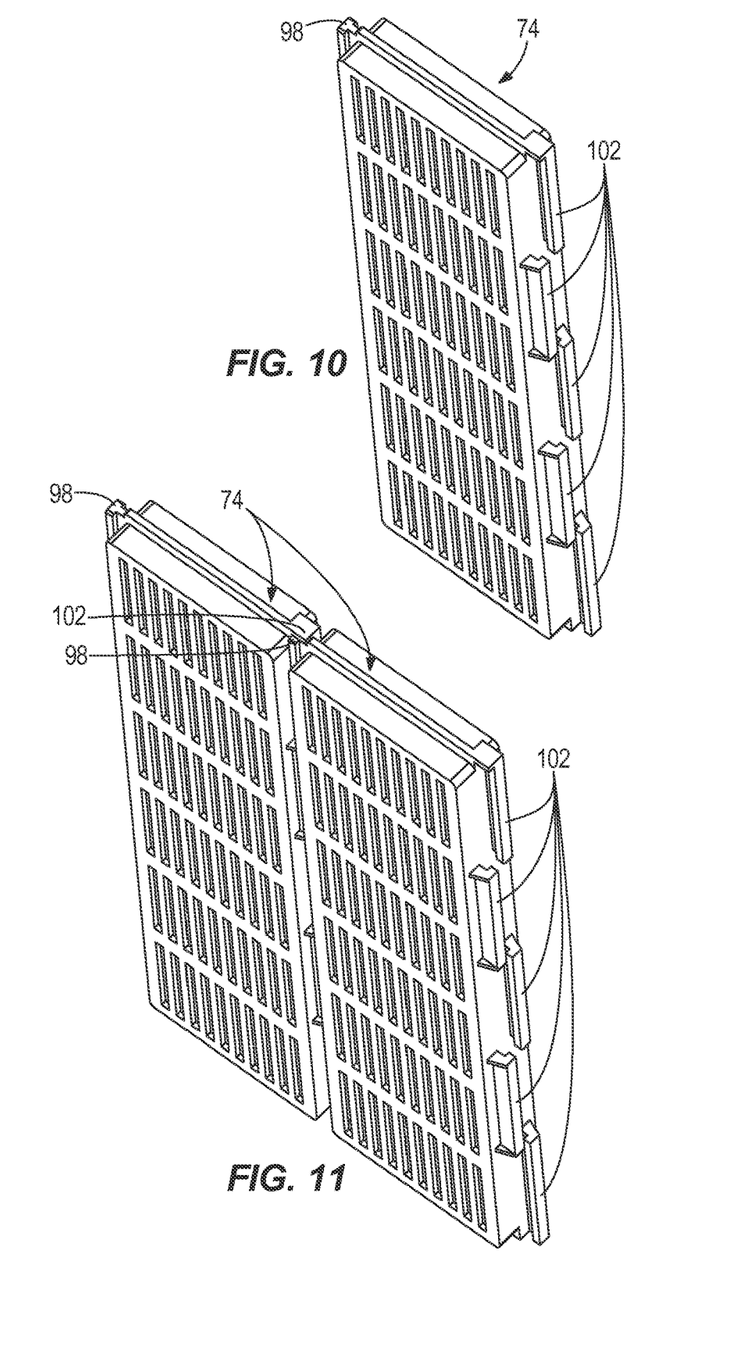
FIG. 10 is a perspective view of a filter cartridge of the filter and pump assembly.
FIG. 11 is a perspective view of the filter cartridge coupled to a second filter cartridge.

As illustrated in FIGS. 10 and 11, the filter cartridges 74 are modular, such that each filter cartridge 74 may easily be replaced with another filter cartridge 74 without the need to replace all of the filter cartridges 74. In the illustrated construction the filter cartridges 74 are coupled to one another in a quick-release manner, such that one of the filter cartridges 74 may easily be removed from the other (for example by simply only pulling up on one of the filter cartridges 74 in a linear direction). Each of the filter cartridges 74 includes at least a first guide element 98 along one side of the filter cartridge 74, and at least a second guide element 102 along an opposite side of the filter cartridge 74. In the illustrated constructions the first guide element 98 is an elongate, generally T-shaped side edge protrusion, and the second guide elements 102 are hook-like members that grasp and retain the side edge protrusion 98 of another filter cartridge 74. Other constructions include different types of first and second guide elements 98, 102, including but not limited to various types of protrusions, slots, grooves, keyways, etc.

The guide elements 98, 102 permit multiple filter cartridges 74 to be assembled together, as well as damaged or worn filter cartridges 74 to be removed and replaced. For example, and with reference to FIGS. 6 and 8, the pump 30 includes an outlet 106 in the cavity 62 that is disposed adjacent one of the filter cartridges 74. The filter cartridges 74 divide the cavity 62 into an unfiltered portion 107 (containing unfiltered water) and a filtered portion 108 (containing filtered water), with the outlet 106 being disposed in the unfiltered portion 107. The outlet 106 delivers water from the pump 30 into the unfiltered portion 107, where the water is then sent through the filter cartridges 74 to be filtered. The filtered water in the filtered portion 108 then exits through the water outlet 94. The filter cartridge 74 nearest the outlet 106 may wear out or clogs faster than the adjacent filter cartridge 74. In the event of replacement, the filter cartridge 74 nearest the outlet 106 may be removed and replaced with a new filter cartridge 74. Alternatively, the remaining filter cartridge 74 (i.e., the filter cartridge in FIG. 6 located farthest from the outlet 106) may be moved over to the position adjacent the outlet 106, and a new filter cartridge 74 may then be inserted into the position formerly occupied by the remaining filter cartridge 74.

In some alternative constructions, each filter cartridge 74 includes a plurality of discrete, removable modular sections stacked vertically on top of one another within the upper housing 30 (e.g., each of the filter cartridges having three sections, with each of the sections extending between the guide element 98 and the guide element 102). These discrete, removable sections may be replaced or moved, similar to the manner described above, such that as one section becomes worn or damaged, that section is removed and is either replaced with a new section or with a remaining section that has less wear and damage.

The illustrated construction includes two filter cartridges 74, although other constructions include different numbers of filter cartridges 74. The number of filter cartridges 74 depends on the size of the aquarium, and/or the degree of filtration desired. The larger the aquarium, generally the more filter cartridges 74 are used. However, the filtration system 10 can operate with only a single filter cartridge 74 if desired. Thus, one filter cartridge design is able to accommodate virtually any size aquarium by simply adding or removing cartridges to adjust the filter surface area or size.

With reference to FIGS. 3 and 4, the filtration system 10 further includes a door 110. The door 110 is selectively opened by grasping and pulling on a set of ribs 114. Alternatively, the door 100 slides between a closed position and an open positioned. In some constructions the door is completely removable from the upper housing 30. In some constructions the door 110 is pivotally coupled to the upper housing 30. Opening the door 110 allows filtered water to pass directly out of the front of the upper housing 30, well below the water outlet 94 and the cover 50 such that no waterfall effect is produced and the filtered water quietly reenters the aquarium. The door 110 also allows an operator to open the cover 50 and reach into the inner cavity 62 during filtration, without disturbing the flow of water out of the upper housing 30, and without having to reach through water passing out of the upper housing 30 in order to access the filter cartridge 74. In preferred constructions, a grate or other large debris filter mechanism is positioned in front of the opening so that when the door 110 is removed or moved to an open position, the grate inhibits the passage of large debris or other large objects. In some constructions the door 110 is pivotally (or slidably) coupled to a portion of the housing 30, such that the door is not completely removed when opened. In some constructions the door 110 is alternatively a bypass water outlet that simply redirects unfiltered water back into the aquarium.

Figure 12:
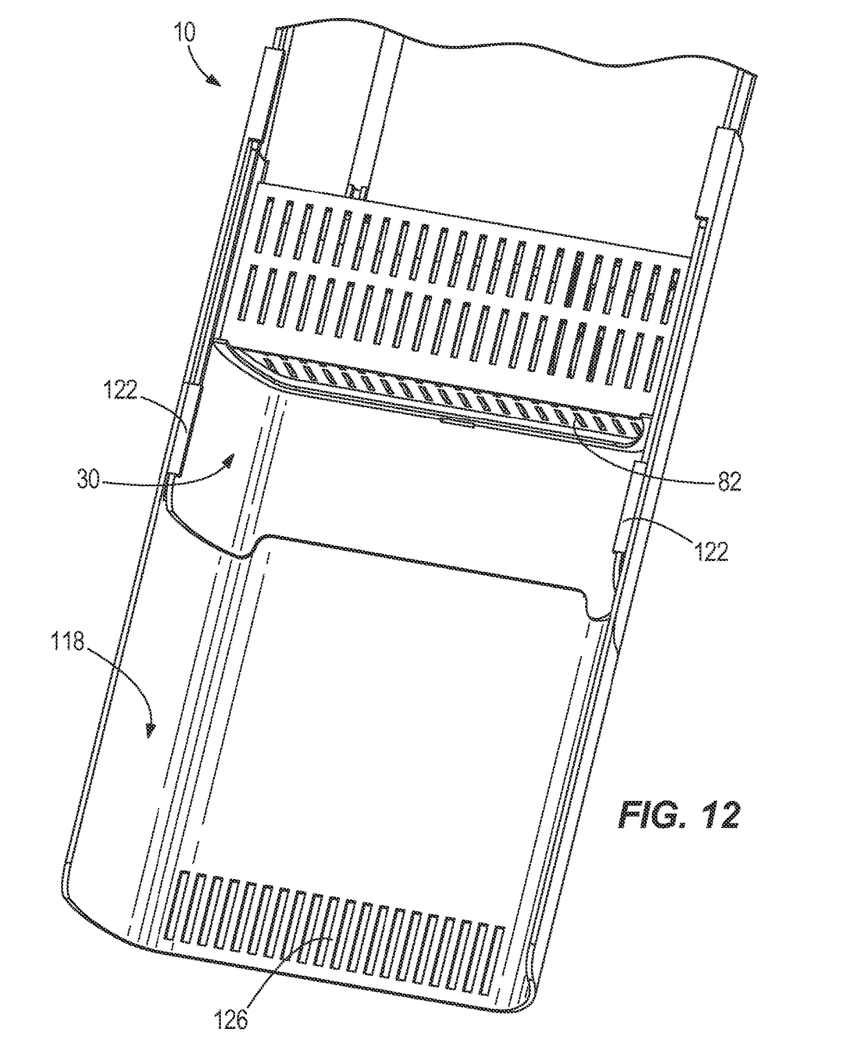
FIG. 12 is a rear perspective view of a bottom of the filtration system of FIG. 1.

With reference to FIGS. 1, 2, and 12, the filtration system 10 further includes a lower housing 118 that is coupled to the upper housing 30. The lower housing 118 extends beneath the upper housing 30 and is disposed entirely within the interior 46 of the aquarium 14. As illustrated in FIG. 12, the lower housing 118 is slidably coupled to the upper housing 118 through use of guide elements 122 on one or both of the upper and lower housings 30, 118, such that an overall length of the filtration system 10 may be adjusted. For example, the lower housing 118 may be extended relative to the upper housing 30 until the lower housing 118 contacts the base 18 of the aquarium 14 (or of any other aquarium within which the filtration system 10 is used). The illustrated guide elements 122 are protrusions on the upper housing 30 that hook over and receive the lower housing 118. Other constructions include different structures for the guide elements 122, as well as different locations for the guide elements 122.

With continued reference to FIG. 12, the lower housing 118 includes a water inlet 126 in the form of a vent that operates to inhibit the entry of large particles into the pump. When the pump 70 is activated (e.g., by the heater and/or control unit 78), water is drawn in through the water inlet 126, up through the lower housing 118, and through the water inlet 82 and into the housing 30.

With reference to FIGS. 2 and 4, the filtration system 10 further includes a plurality of lighting elements 130. The lighting elements 130 are LED lights arranged in a pattern along the housing 30 that direct light into the aquarium 14. The lighting elements 130 are controlled by the heater and/or control unit 78. In some constructions, the heater and/or control unit 78 controls the timing of the operation of the lighting elements 130 (on-off time, duration, etc.), the color of the lighting elements 130, the brightness or intensity of the lighting elements 130, as well as other controllable lighting parameters. Other constructions include different types, numbers, and arrangements of lighting elements 130.

Figure 13:
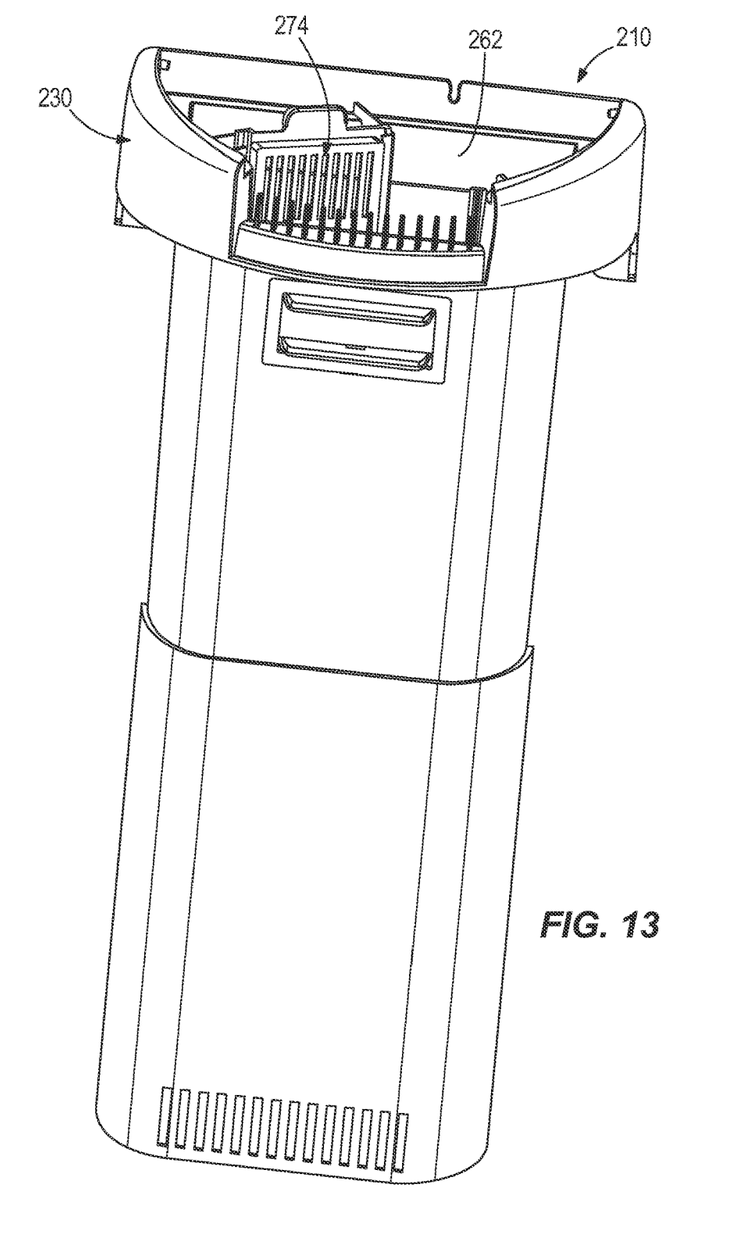
FIG. 13 is a front perspective view of a filtration system according to another construction of the invention.
Figure 14:
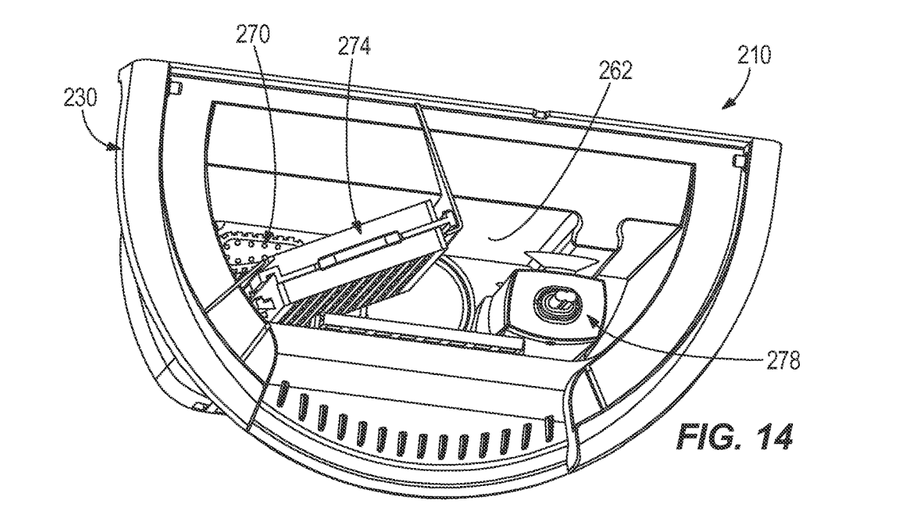
FIG. 14 is a perspective view of a filter and pump assembly of the filtration system of FIG. 11.
Figure 15:
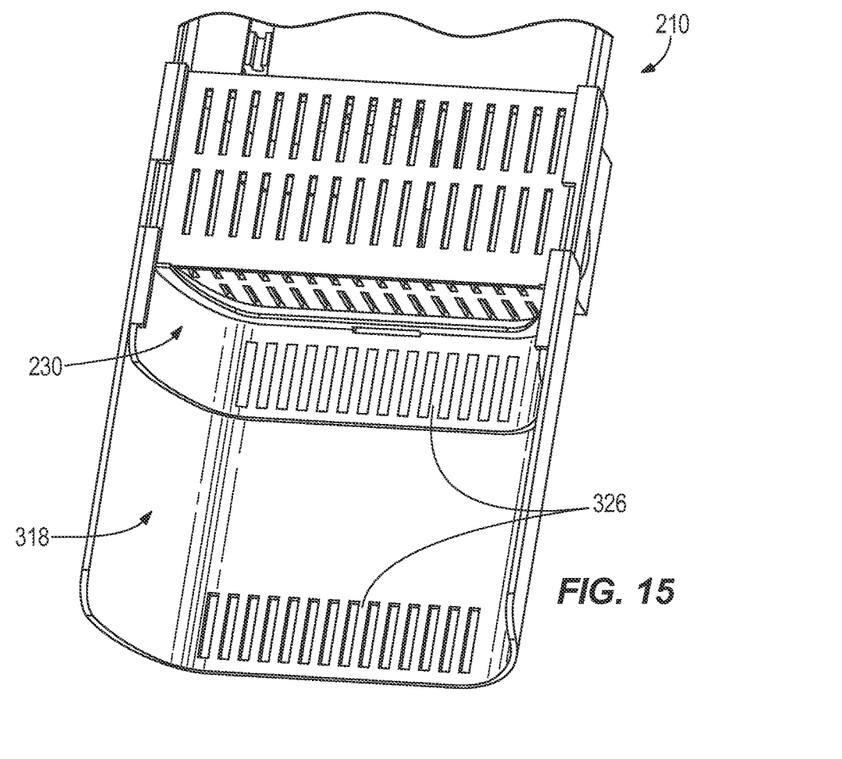
FIG. 15 is a rear perspective view of a bottom of the filtration system of FIG. 11.

FIGS. 13-15 illustrate a filtration system 210 for use with an aquarium smaller than the aquarium 14 (e.g., a ten-gallon aquarium). As with the filtration system 10, the filtration system 210 is configured to be removably coupled to an aquarium.

With reference to FIGS. 13 and 14, because the filtration system 210 is sized for a smaller aquarium, the filtration system includes just a single filter cartridge 274. Similar to the filtration system 10, the single filter cartridge 274 is disposed within a cavity 262 in an upper housing 230, and receives water pumped into the upper housing 230 from a pump 270. The pump 270 is operated by a heater and/or control unit 278.

With reference to FIG. 15, the filtration system 210 also includes a lower housing 318. Similar to the filtration system 10, the lower housing 318 is slidably coupled to the housing 230. In the illustrated construction, both the lower housing 318 and the upper housing 230 include a water inlet 326. When the lower housing 318 is retracted (i.e., pulled up relative the upper housing 230), the water inlets 326 overlap with one another and are both used to permit entry of water into the filtration system 210. When the lower housing 318 is extended (i.e., pulled down relative to the upper housing 230), the water inlet 326 on the upper housing 230 is blocked by the lower housing 318, and the water inlet 326 on the lower housing 318 is used by itself to permit entry of water into the filtration system 210. Other constructions include different locations and numbers of water inlets 326.

In another construction, the filter cartridge 74 is removed leaving a large empty space 62 that is suitable for aquaponics. A media such as hydrocorn is placed on the bottom wall 84 to support a live plant that is placed in the space 62 previously occupied by the filter cartridge 74. The plants roots cling to the media and the media provides additional surface area for the growth of useful bacteria. The plant acts as a natural filter as the pump 70 continues to operate as described above. The cover 50 is replaced with a smaller cover that provides an opening through which the plant can grow. In one construction, the cover is substantially annular with a large opening in the middle for the plant. The grate, positioned in front of the opening for the door 110 inhibits the escape of large debris such as the media or plant parts that are shed by the living plant.

Although the invention has been described in detail with reference to certain preferred embodiments, variations and modifications exist within the scope and spirit of one or more independent aspects of the invention as described.

What is claimed is:

1. A filtration system for a fish tank, the filtration system comprising:
    an upper housing having an interior cavity;
    a lower housing slidingly coupled to the upper housing to permit changes in an overall length of the filtration system, wherein the overall length is measured along a vertical direction, and wherein the lower housing includes at least one water inlet configured to receive water from the fish tank;
    a filter cartridge disposed at least partially within the inner cavity; and
    a pump configured to draw water from the lower housing along the vertical direction and into the inner cavity and through the filter cartridge.

2. The filtration system of claim 1, wherein the upper housing includes a notched area along a rear portion of the upper housing, the notched area including an angled surface.

3. An aquarium that includes the filtration system of claim 2, wherein the aquarium includes a frame that defines an interior for housing water, wherein the upper housing is coupled to an edge of the frame along the notched area, and wherein the upper housing includes a first portion that is disposed above the frame and a second portion that extends within the interior of the frame.

4. The filtration system of claim 1, wherein the upper housing includes a water inlet, and wherein the pump is disposed above the water inlet and is configured to pump water up through the water inlet and into the interior cavity.

5. The filtration system of claim 4, wherein the interior cavity is defined in part by an interior wall, wherein the pump extends through the interior wall, such that a first portion of the pump is disposed below the interior wall but above the water inlet, and a second portion of the pump is disposed above the interior wall and in the interior cavity.

6. The filtration system of claim 1, further comprising a heater and a temperatures sensor disposed at least partially in the interior cavity, and a controller in communication with the heater and temperature sensor, wherein the temperature sensor is configured to measure water temperatures as water passes through the filter cartridge, wherein the controller is configured to compare the measured temperatures to a desired temperature, and wherein the controller is configured to provide power to the heater based on the comparison of temperatures.

7. The filtration system of claim 1, wherein the upper housing includes a water outlet along a front portion of the upper housing.

8. An aquarium that includes the filtration system of claim 7, wherein the aquarium includes a frame that defines an interior for housing water, wherein the upper housing is coupled an edge of the frame such that the water outlet is disposed above the interior of the aquarium, and such that water passing out of the water outlet falls out of the water outlet into the interior of the aquarium.

9. The filtration system of claim 7, further comprising a removable door coupled to the upper housing, wherein the removable door is disposed below the water outlet such that when the removable door is removed from the upper housing, water passes out of the upper housing in an area below the water outlet instead of through the water outlet, and a water level within the interior cavity is lowered.

10. The filtration system of claim 1, wherein the filtration system includes a plurality of modular filter cartridges that are releasably coupled to one another, and wherein each of the modular filter cartridges includes a first guide element along a first side of the filter cartridge and a second guide element along an opposite side of the filter cartridge, such that at least one of the first guide elements on a first filter cartridge is removably coupled with a second guide element on a second filter cartridge.

11. The filtration system of claim 1, wherein the lower housing includes a water inlet, such that the pump draws water into the lower housing through the water inlet.

12. The filtration system of claim 11, wherein the water inlet is a first water inlet, and wherein the upper housing includes a second water inlet, wherein the pump is disposed above the second water inlet and is configured to pump water up through both the first and second water inlets and into the interior cavity.

13. The filtration system of claim 1, further comprising a plurality of LEDs disposed along a surface of the upper housing.

14. The filtration system of claim 1, wherein the lower housing includes a first water inlet and the upper housing includes a second water inlet, wherein when the second water inlet overlaps with the first water inlet when the lower housing is retracted relative to the upper housing, and wherein the second water inlet is blocked by the lower housing when the lower housing is extended relative to the upper housing.

15. A filtration system for a fish tank, the filtration system comprising:
an upper housing having a cavity;
a lower housing coupled to the upper housing;
a plurality of modular filter cartridges disposed within the cavity and releasably directly coupled to one another, each of the modular filter cartridges having a first guide element along a first side of the filter cartridge and a second guide element along an opposite side of the filter cartridge, such that at least one of the first guide elements on a first filter cartridge is physically and removably coupled with a second guide element on a second filter cartridge, wherein each of the modular filter cartridges is configured to separately filter and clean water within the cavity; and
a pump configured to draw water into the cavity and through the plurality of modular filter cartridges.

16. The filtration system of claim 15, wherein the plurality of modular filter cartridges are coupled to one another in a quick-release manner, such that the first filter cartridge is removable from the second filter cartridge by pulling on the first filter cartridge.

17. The filtration system of claim 15, wherein the first guide element is an elongate, generally T-shaped protrusion along a side of the filter cartridge, and the second guide element is a hook-like member that releasably grasps and retains the first guide element.

18. The filtration system of claim 15, wherein the upper housing includes a water outlet along a front portion of the upper housing.

19. The filtration system of claim 18, further comprising a removable door coupled to the upper housing, wherein the removable door is disposed below the water outlet such that when the removable door is removed from the upper housing, water passes out of the upper housing in an area below the water outlet instead of through the water outlet, and a water level within the interior cavity is lowered.

20. The filtration system of claim 15, wherein the lower housing includes a water inlet, and wherein the pump is configured to draw water into the lower housing through the water inlet.

21. The filtration system of claim 1, wherein the inner cavity is configured to be disposed above the lower housing during operation of the filtration system.

* * * * *